United States Patent
Reinert et al.

(10) Patent No.: US 11,689,434 B1
(45) Date of Patent: *Jun. 27, 2023

(54) NETWORK ANOMALY DETECTION

(71) Applicant: Fleet Defender, Inc., Springfield, NE (US)

(72) Inventors: Terry Reinert, Springfield, NE (US); Tanner Sorensen, Omaha, NE (US)

(73) Assignee: Fleet Defender, Inc., Springfield, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,294

(22) Filed: Jul. 15, 2022

Related U.S. Application Data

(63) Continuation of application No. 17/319,828, filed on May 13, 2021, now Pat. No. 11,425,005.

(60) Provisional application No. 63/112,002, filed on Nov. 10, 2020.

(51) Int. Cl.
*H04L 43/04* (2022.01)
*H04L 12/40* (2006.01)
*G06N 3/045* (2023.01)

(52) U.S. Cl.
CPC ............ *H04L 43/04* (2013.01); *G06N 3/045* (2023.01); *H04L 12/40013* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 9,380,070 | B1 | 6/2016 | Cain et al. |
| 9,401,923 | B2 | 7/2016 | Valasek et al. |
| 9,787,703 | B2 | 10/2017 | Moeller et al. |
| 9,813,436 | B2 | 11/2017 | Moeller et al. |
| 10,083,071 | B2 | 9/2018 | Sonalker et al. |
| 10,328,874 | B2 | 6/2019 | Haga et al. |
| 2016/0381067 | A1 | 12/2016 | Galula et al. |
| 2017/0013005 | A1 | 1/2017 | Galula et al. |
| 2018/0295147 | A1 | 10/2018 | Haga et al. |
| 2019/0371085 | A1 | 12/2019 | Kishikawa et al. |
| 2021/0218764 | A1 | 7/2021 | Lowney et al. |

FOREIGN PATENT DOCUMENTS

| | | |
|---|---|---|
| WO | 2016108961 A1 | 7/2016 |
| WO | 2019191506 A1 | 10/2019 |

OTHER PUBLICATIONS

Jacobs, Robert A. et al., "Adaptive Mixtures of Local Experts", Neural Computation, 3, 79-87, Feb. 1991, 50 pages.

Reynolds, Douglas A. et al., "Speaker Verification Using Adapted Gaussian Mixture Models", Digital Signal Processing, 10, 19-41, (2000), 23 pages.

*Primary Examiner* — Angela Nguyen
(74) *Attorney, Agent, or Firm* — Suiter Swantz pc llo

(57) ABSTRACT

An anomaly detector of a Controller Area Network (CAN) bus performs analysis on messages received from the CAN bus to determine if the messages are anomalous. The anomaly detector may be implemented on a vehicle by an Electronic Control Unit (ECU). The anomaly detector may extract a batch of feature vectors for binary messages received from the CAN bus. The anomaly detector then performs a model adaption to adapt a previous probability model with the batch of feature vectors. The adapted probability model is then compared with a universal background model to determine a network anomaly level.

20 Claims, 5 Drawing Sheets

NETWORK ANOMALY DETECTION

CROSS-REFERENCE TO RELATED APPLICATION

The present application claims priority to U.S. Non-Provisional patent application Ser. No. 17/319,828, filed on May 13, 2021, which claims priority to U.S. Provisional Application Ser. No. 63/112,002 filed on Nov. 10, 2020, whereby each of the above-listed applications is incorporated herein by reference in the entirety.

TECHNICAL FIELD

The present disclosure generally relates to information security, and more particularly to methods and systems for anomaly detection of Controller Area Network (CAN) messages.

BACKGROUND

A vehicle may include one or more nodes which are communicatively coupled by a data bus. The data bus may include a Controller Area Network (CAN) bus. The CAN bus is a data bus used in ground-based vehicles. The nodes may communicate over the CAN bus by a CAN protocol format, such as, a base frame with an eleven-bit identifier or an extended frame with a twenty-nine-bit identifier. The CAN bus may further include ports by which additional nodes may be added. Thus, the CAN bus may be vulnerable to an intrusion from the nodes of the vehicle. If the CAN bus has been compromised by an outside source, various vehicle functions may be similarly compromised. Furthermore, CAN bus intrusion techniques may adapt over time.

Therefore, it would be desirable to provide a system and a method that cure one or more of the shortfalls of the previous approaches identified above.

SUMMARY

A method is disclosed, in accordance with one or more embodiments of the present disclosure. In one embodiment, the method includes receiving a plurality of messages from a controller area network (CAN) bus of a vehicle. In another embodiment, at least one of the plurality of binary messages consists of a controller area network format comprising an arbitration field and a data field. In another embodiment, the method includes generating a current batch of a plurality of feature vectors, each of the plurality of feature vectors determined based on the plurality of binary messages. In another embodiment, the method includes determining a current probability model by adapting a previous probability model with the current batch of the plurality of feature vectors. In another embodiment, the method includes comparing the current probability model with a universal background model (UBM) to determine a network anomaly level. In another embodiment, the universal background model provides a probability distribution of the plurality of feature vectors under typical network conditions.

An anomaly detector for a controller area network (CAN) bus of a vehicle is disclosed, in accordance with one or more embodiments of the present disclosure. In one embodiment, the anomaly detector includes a communication interface configured to receive a plurality of binary messages from the controller area network bus. In another embodiment, at least one of the plurality of binary messages consists of a controller area network format comprising an arbitration field and a data field. In another embodiment, the anomaly detector includes a memory configured to store program instructions and the plurality of binary messages received by the communication interface. In another embodiment, the anomaly detector includes a processor configured to execute the program instructions in the memory. In another embodiment, the program instructions cause the processor to generate a current batch of a plurality of feature vectors. In another embodiment, each of the plurality of feature vectors are determined based on the plurality of binary messages. In another embodiment, the program instructions cause the processor to determine a current probability model by adapting a previous probability model with the current batch of the plurality of feature vectors. In another embodiment, the program instructions cause the processor to compare the current probability model with a universal background model (UBM) to determine a network anomaly level. In another embodiment, the universal background model provides a probability distribution of the plurality of feature vectors under typical network conditions.

An anomaly detection system is disclosed, in accordance with one or more embodiments of the present disclosure. In one embodiment, the anomaly detection system includes a plurality of vehicles. In another embodiment, each of the plurality of vehicles include at least one controller area network (CAN) bus. In another embodiment, each of the plurality of vehicles include a plurality of nodes communicatively coupled by the at least one controller area network bus. In another embodiment, at least one node of the plurality of nodes is configured to transmit a plurality of binary messages by way of the controller area network bus. In another embodiment, at least one of the plurality of binary messages consists of a controller area network format comprising an arbitration field and a data field. In another embodiment, each of the plurality of vehicles include at least one anomaly detector for the at least one controller area network bus. In another embodiment, the at least one anomaly detector includes a communication interface configured to receive the plurality of binary messages from the at least one controller area network bus. In another embodiment, the at least one anomaly detector includes a memory configured to store program instructions and the plurality of binary messages received by the communication interface. In another embodiment, the at least one anomaly detector includes a processor configured to execute the program instructions stored in the memory. In another embodiment, the program instructions cause the processor to generate a current batch of a plurality of feature vectors. In another embodiment, each of the plurality of feature vectors are determined based on the plurality of binary messages. In another embodiment, the program instructions cause the processor to determine a current probability model by adapting a previous probability model with the current batch of the plurality of feature vectors. In another embodiment, the program instructions cause the processor to compare the current probability model with a universal background model (UBM) to determine a network anomaly level. In another embodiment, the universal background model provides a probability distribution of the plurality of feature vectors under typical network conditions. In another embodiment, each of the plurality of vehicles include a transmitter configured to transmit the network anomaly level. In another embodiment, the anomaly detection system includes a server configured to receive the network anomaly level from each of the plurality of vehicles. In another embodiment, the server is configured to receive the network anomaly level from each of the plurality of vehicles. In another embodiment, the server is configured to fuse the network anomaly levels from each of the plurality of vehicles to determine a fleet anomaly level.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
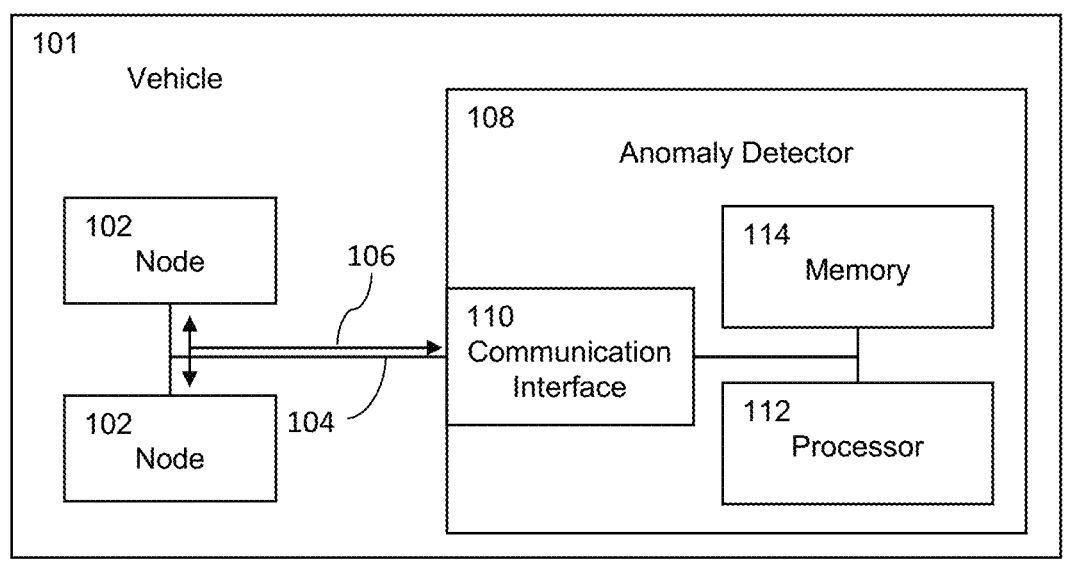
FIGS. 1A-1C illustrate a block diagram view of an anomaly detection system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are generally directed to an anomaly detection system, a vehicle, an anomaly detector, and a method of anomaly detection. Embodiments of the present disclosure are directed to an anomaly detection system which includes one or more vehicles, each of which may include one or more controller area network (CAN) buses. Additional embodiments are directed to a vehicle which includes one or more controller area networks and one or more anomaly detectors for each controller area network. Additional embodiments are directed to the anomaly detector which is configured to execute processor executable code for performing a method of detecting anomalies on binary messages received from the controller area network bus. Additional embodiments are directed to the method of detecting anomalies in the controller area network. The method may include receiving binary messages from the controller area network. A probability distribution of the received binary messages may be generated under typical network conditions and under current network conditions. The probability distribution under the typical network conditions may be compared with the probability distribution under the current network conditions. By the comparison, a network anomaly level may be produced. The network anomaly level (I) may indicate the degree of anomaly of the binary messages. Similarly, a network anomaly label (y) may be produced. The network anomaly label may indicate whether the binary messages include the presence or absence of anomalous messages. The network anomaly level (I) and the network anomaly label (y) may then be collected over time, to determine time-varying anomalies of the controller area network. The network anomaly levels and network anomaly labels may then be shared from multiple vehicles to a server. The network anomaly levels from the multiple networks may then be fused into a fleet anomaly level and a fleet anomaly label. The fleet anomaly level may indicate a degree of anomaly for one or more vehicles in the fleet. The fleet anomaly label may indicate a presence of an anomaly in a CAN bus of one or more vehicles in the fleet. By the fleet anomaly label, one or more users (e.g., a system engineer) may be notified of an intrusion into the CAN bus, for addressing the associated network intrusion.

Furthermore, set (P) may be associated with one or more of the networks, the set (P) including time-varying network anomaly levels (e.g., $I_1$, through $I_P$, etc.) and time-varying anomaly labels (e.g., $y_1$, through $y_P$, etc.). Such time-varying network labels may be collected by iteratively performing the anomaly detection method and storing the network anomaly levels in a memory.

Figure 1B:
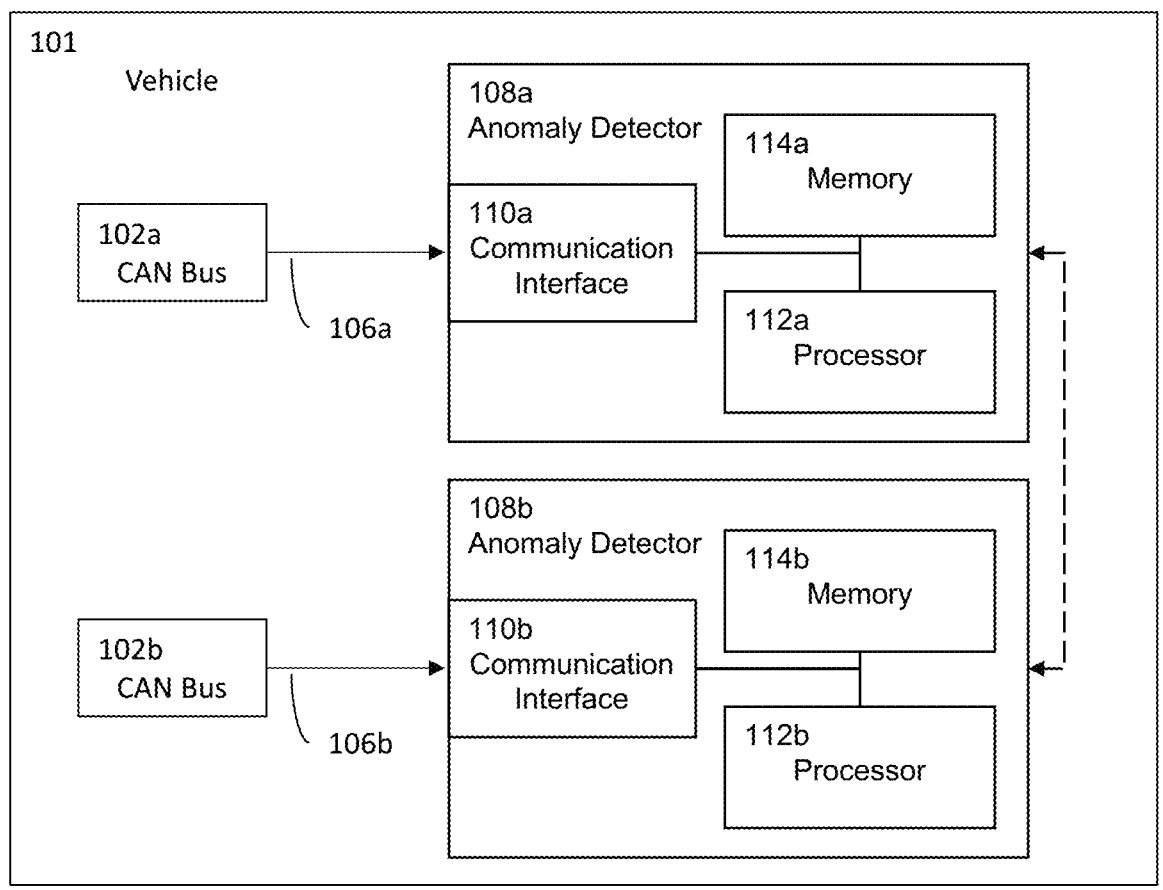
Figure 1C:
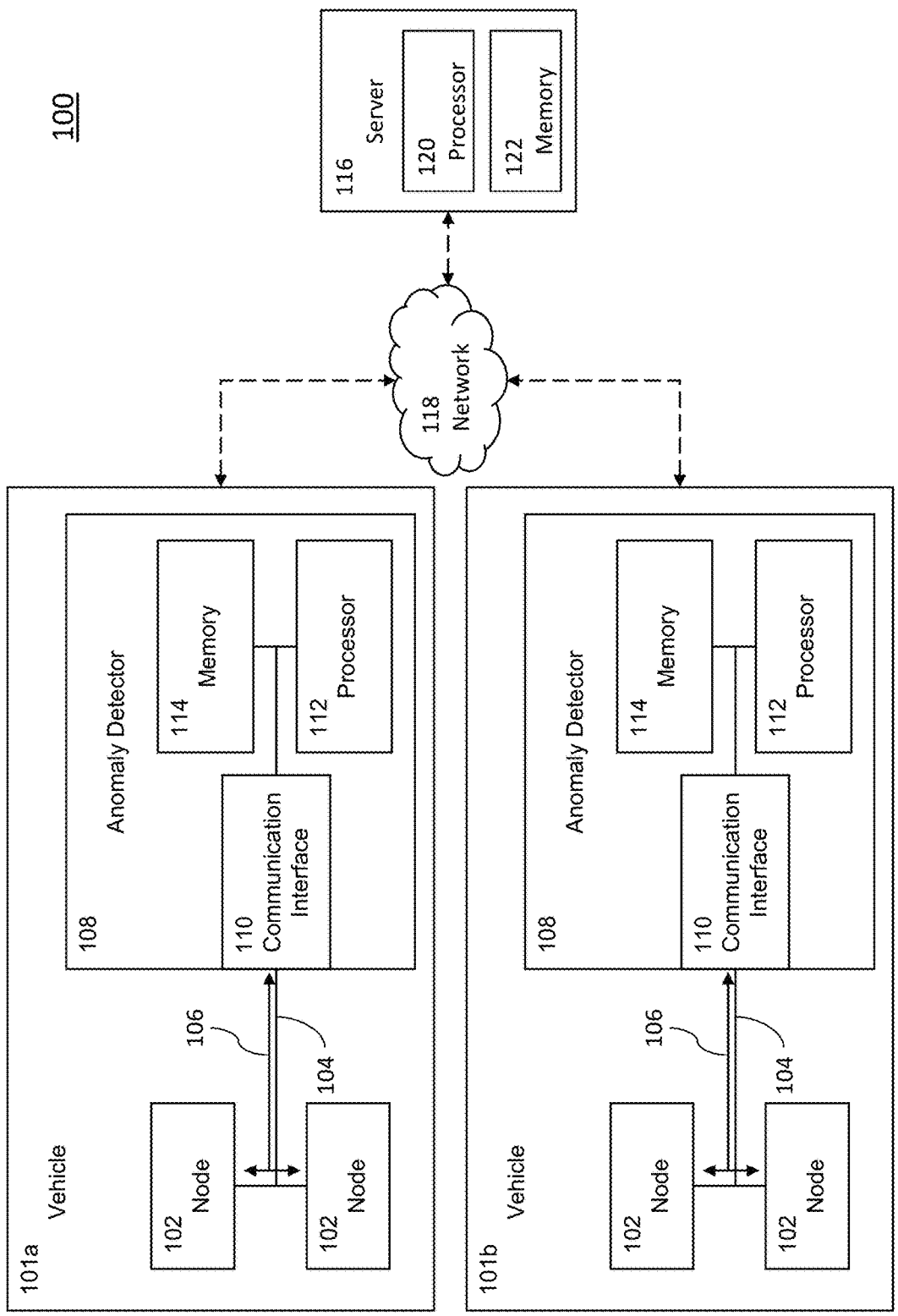

Referring now to FIGS. 1A-1C, an anomaly detection system 100 is disclosed. The anomaly detection system 100 may include one or more vehicles 101. The anomaly system 100 may detect and indicate a presence of an anomaly in a network of the one or more vehicles 101, as described in more detail herein. The one or more vehicles 101 may include one or more nodes 102. The nodes 102 may include any node, such as, but not limited to, an electronic control unit (ECUs). The vehicle 101 may further include a data bus, by which the nodes 102 may communicate. The data bus may include any data bus, such as, but not limited to, a controller area network (CAN) bus 104. By the CAN bus 104, the nodes 102 may communicate a binary message 106 with other nodes. The binary messages 106 may include a controller area network format. For example, the controller area network format may include any suitable format, such as, but not limited to, CAN 2.0A including a 11-bit identifier, CAN 2.0B including a 29-bit identifier, ISO 11898-1, ISO 11898-2, ISO 11898-3, or CAN FD 1.0 (CAN with flexible data rate). The controller area network format may include one or more of an arbitration field and a data field.

The vehicle 101 may also include an anomaly detector 108. The anomaly detector 108 may be configured to receive the binary messages 106 from the CAN bus 104. For example, the anomaly detector 108 may include a communication interface 110, by which the anomaly detector 108 may be coupled to the CAN bus 104 for receiving the binary messages 106. The communication interface 110 may include any suitable communication interface known in the art. In this regard, communication interfaces for automotive ECUs may encompass a variety communication interfaces for interfacing with the CAN bus 104, such as, but not limited to, a 9-pin D-sub type connector. The anomaly detector 108 may execute one or more program instructions, such that the anomaly is configured to produce a network anomaly level and a network label based on the binary messages 106. For example, the anomaly detector 108 may include a processor 112 and a memory 114. One or more of the processors 112 or the memory 114 may be coupled to the communication interface 110 for receiving the binary messages 106 from the communication interface 110. In this regard, the memory 114 may store the binary messages 106 received by the communication interface 110. The memory 114 may also maintain program instructions which may be executed by the processor 112. By executing the program instructions, the processor 112 may execute any of the various process steps described throughout the present disclosure. In one embodiment, the network anomaly level may be produced by the processor 112. For example, the binary messages 106 may be received from the CAN bus 104 of the vehicle 101. Based on the binary messages 106, the processor 112 may generate a current batch of feature vectors. The current batch of feature vectors may be determined by binning the binary messages into multiple frames, extracting a feature vector for each of the frames, and binning the feature vectors into the current batch. The processor 112 may then generate a current probability model by adapting a previous probability model with the current batch of feature vectors. The current probability model may provide a probability distribution for the feature vectors under current network conditions. The processor 112 may then compare the current probability model with a universal background model (UBM) to determine the network anomaly level. The universal background model may provide a probability distribution of the plurality of feature vectors under typical network conditions.

As depicted in FIG. 1B, vehicle 101 may include multiple CAN buses 104 (e.g., a CAN bus 104a-104b). Where a plurality of CAN buses 104 are included in the vehicle 101, the plurality of CAN buses 104 may be used for various systems of the vehicle 101. For example, the vehicle may include various systems each including a CAN bus 104, such as, but not limited to, an engine control system, an emission control system, a vehicle vision system, a braking system, or a comfort accessory system. Th vehicle 101 may also include a plurality of the anomaly detectors 108 (e.g., anomaly detectors 108a-108b), where each of the plurality of detectors 108 is associated with one of the CAN buses 104. For example, the anomaly detector 108a may be associated with the CAN bus 104a for receiving binary messages 106a by the communication interface 110a. By way of another example, the anomaly detector 108b may be associated with the CAN bus 104b for receiving binary messages 106b by the communication interface 110b. In this regard, the multiple anomaly detectors 108 may be associated with individual controller area network buses 104. Network anomaly levels for each CAN bus 104 may be determined, in accordance with one or more embodiments of the present disclosure. The network anomaly levels may then be shared. For example, the network anomaly levels may be shared with one or more of the processors 112 (e.g., by way of the communication interface). By way of another example, the network anomaly levels may be shared with a server (see FIG. 1C). The network anomaly levels for the vehicle 101 may then be fused (e.g., by the processor 112, by the server, etc.) to generate a vehicle anomaly level and a vehicle anomaly label. The vehicle anomaly level and label may be appropriate for determining whether the vehicle 101 is exhibiting anomalous CAN messaging.

Referring now to FIG. 1C, the system 100 may include a plurality of vehicles 101 (e.g., vehicle 101a-101b). Furthermore, each vehicle 101 may include one or more CAN buses 104. The system 100 may further include a server 116. The server 116 may be communicatively coupled with each vehicle 101 by way of a network 118. The network 118 may include any wireline communication protocol (e.g., DSL-based interconnection, cable-based interconnection, T9-based interconnection, and the like) or wireless communication protocol (e.g., GSM, GPRS, CDMA, EV-DO, EDGE, WiMAX, 3G, 4G, 4G LTE, 5G, Wi-Fi protocols, RF, Bluetooth, and the like) known in the art. By way of another example, the network 118 may include communication protocols including, but not limited to, radio frequency identification (RFID) protocols, open-sourced radio frequencies, and the like. Accordingly, an interaction between the vehicle 101 and the server 116 may be determined based on one or more characteristics including, but not limited to, cellular signatures, IP addresses, MAC addresses, Bluetooth signatures, radio frequency identification (RFID) tags, and the like.

The server 116 may include a processor 120 and a memory 122. The server may also include a cloud-based architecture. For instance, it is contemplated herein that the server 116 may include a hosted server and/or cloud computing platform including, but not limited to, Amazon Web Services (e.g., Amazon EC2, and the like). In this regard, the anomaly detection system 100 may include a software as a service (SaaS) configuration, in which various functions or steps of the present disclosure are carried out by the server 116. For example, the server 116 may fuse network anomaly levels from anomaly detectors 108 of the vehicles 101 to generate a fleet anomaly level (L). The fleet anomaly level (L) may indicate a degree of an anomaly in the fleet of vehicles. The fusion may occur by any suitable method, such as, but not limited to, a mixture of expert's (MoE) neural network technique (e.g., a gated MoE consisting of feed forward sub-networks). Mixture of Experts is described in the journal "Neural Computations" under an article titled "Adaptive Mixtures of Local Experts", published in 1991, by Robert A. Jacobs et al, which is incorporated by reference herein in its entirety. The fusion by Mixture of Experts is not intended to be limiting. In embodiments, fusion may occur by any suitable method, such as, but not limited to a Bayesian model averaging method, a committee method, a boosting method, a tree-based method, or a conditional mixture method.

The fleet anomaly level (L) may then be compared to a threshold to determine a fleet anomaly label (Y). For example, if the fleet anomaly level is less than the threshold, the anomaly detection system 100 may assign a fleet anomaly label indicating a typical fleet condition (e.g., Y=0). Alternatively, if the fleet anomaly level is greater than or equal to the threshold, the anomaly detection system 100 may assign a fleet anomaly label indicating an anomalous fleet condition (e.g., Y=1). As may be understood, the inequalities provided herein are not intended to be limiting. In this regard, the fleet anomaly level may be compared to the threshold in any suitable manner.

By fusing the network anomaly levels into a fleet anomaly level, anomalies across multiple CAN buses 104 may be aggregated. Similarly, anomalies across multiple vehicles 101 may be aggregated. Such aggregation may provide for detecting anomalies in CAN buses 104 at a fleet level.

Figure 2:
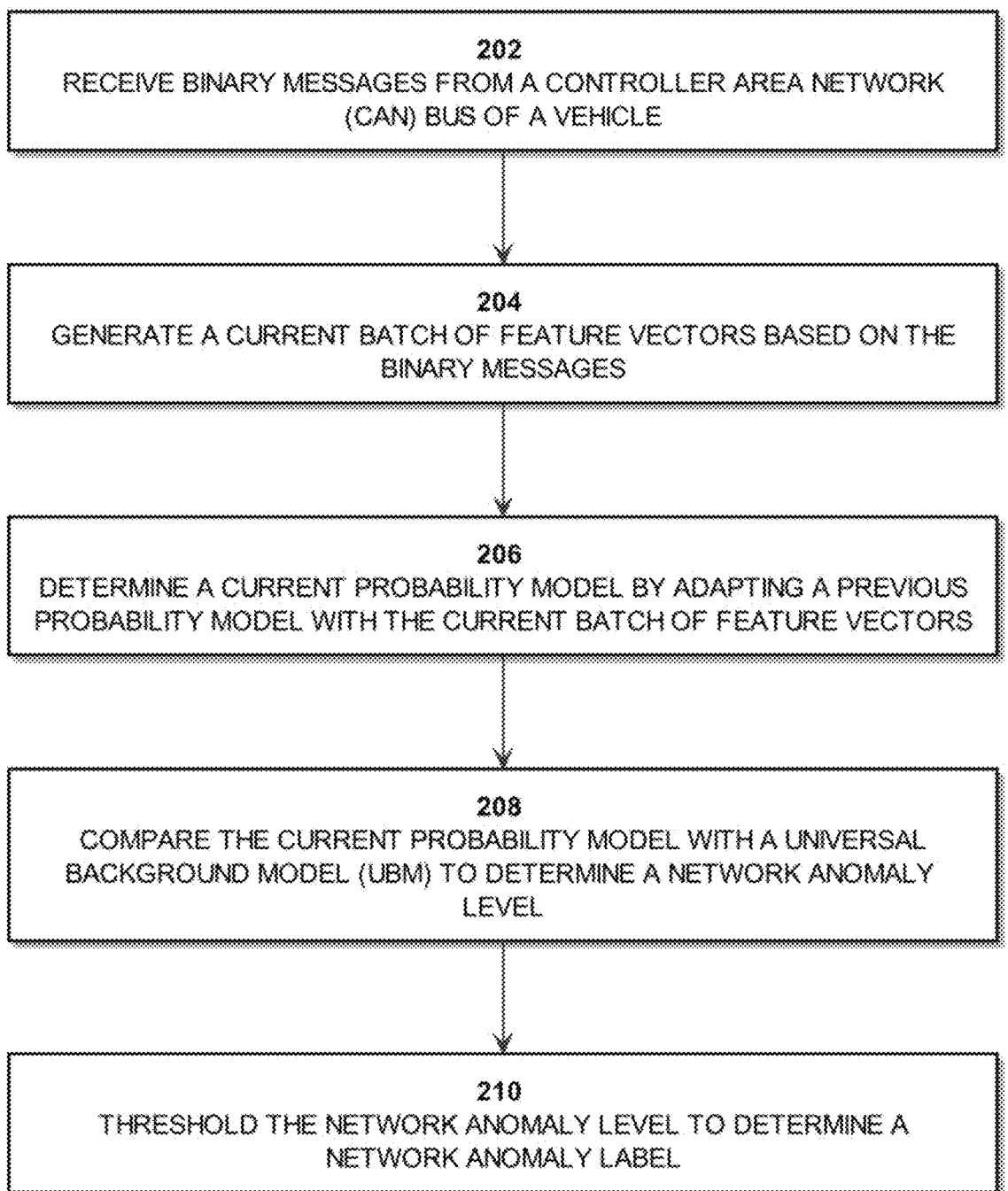
FIG. 2 illustrates a flow diagram of a method of anomaly detection, in accordance with one or more embodiments of the present disclosure.

Referring now to FIG. 2, a flow diagram of a method 200 of anomaly detection is described, in accordance with one or more embodiments of the present disclosure. The embodiments and the enabling technologies described previously herein in the context of the anomaly detection system 100 should be interpreted to extend to the method 200. In this regard, the anomaly detector 108 may be configured to perform the method 200 by executing the program instructions maintained on the memory 114. Similarly, the server 116 may be configured to perform the method 200 by executing program instructions maintained on the memory 122. It is further recognized, however, that the method 200 is not limited to the anomaly detection system 100, the vehicle 101, or the anomaly detector 108.

In a step 202, a plurality of binary messages (e.g., binary messages 106) are received from a controller area network bus (e.g., controller area network bus 104) of a vehicle (e.g., vehicle 101).

In a step 204, a batch of multiple feature vectors is generated. Each of the feature vectors may be based on one or more binary messages. To determine the feature vectors, messages transmitted over the CAN bus during a time interval may be binned in a frame. For example, the time interval of the frame may include any suitable interval during which binary messages are included, such as, but not limited to, from five to ten seconds. For any given frame (i), a feature vector ($X_i$) may be extracted from the frame. The feature vectors may be extracted by an encoder (e.g., an encoder process executed by a processor). The encoder may map the binary messages to feature vectors in a continuous latent vector space (e.g., a continuous distribution). The feature vector ($X_i$) may include a set of features derived from a statistical functionals associated with the messages in the frame (i). The feature vectors may then be binned into one or more batches. Each batch may thus include a plurality of continuous feature vectors, where each feature vector is a distribution of messages under a network condition.

In embodiments, the batches of feature vectors may correspond to CAN messages received during a training (e.g., batch of training data). A Universal Background Model (UBM) may be generated. The UBM may model a probability distribution of feature vectors under typical network conditions. The UBM may be generated during a training. The training may include receiving a batch of training data, the batch of training data including feature vectors under typical network conditions. Such batch of training data may be received from a memory (e.g., using feature vectors extracted from a data capture) or may be received from the vehicle (e.g., during model adaptation). The batch of training data may include any suitable number of feature vectors, such as, but not limited, to one million or more feature vectors. The UBM may be generated using the batch of training data by any suitable method. In embodiments, the method of generating the UBM includes using a Gaussian Mixture Model (GMM-UBM). A number of Gaussians (k) of the GMM-UBM may be set to a given number (e.g., 1000). The GMM-UBM may be trained using an Expectation Maximization (EM) algorithm with the batch of training data. The GMM-UBM may thus model arbitrary probability distributions without excess memory or computation requirements.

As discussed previously, the UBM may model a distribution of feature vectors under typical network conditions. During a deployment of the vehicle, network conditions may change over time (e.g., due to an anomalous network condition). When an anomalous network condition is present, a distribution of feature vectors associated with the binary messages of the CAN bus may change. In embodiments, the batch of feature vectors may be determined for CAN messages received during a current network condition (e.g., a current batch of feature vectors).

The method 200 may include comparing the UBM to a model of a distribution of feature vectors under current network conditions. Therefore, it is desirable to generate a model of a distribution of feature vectors under current network conditions. In embodiments, a model of distribution of feature vectors under current network conditions may be generated by a Gaussian Mixture Model, by the previously discussed method of generating a model of feature vectors under typical network conditions. However, generating a new model during current network conditions may not always be feasible (e.g., by having too few current feature vectors, a time associated with generating the new model, a lack of processing power, etc.).

In a step 206, a current probability model is determined by adapting a previous probability model with the current batch of feature vectors. The previous probability model may provide a probability model of batch of feature vectors. In some embodiments, the previous probability model is the uniform background model. In other embodiments, the previous probability model has been directly or indirectly adapted from the uniform background model. For example, during an initialization of the method 200, the current probability model may be adapted from the uniform background model by the current batch of feature vectors. The method 200 may then repeat, such that the current probability model may be considered a previous probability model which may be updated with a next batch of feature vectors. The previous probability model may be adapted by any suitable procedure, such as, but not limited to, an online Bayesian model adaption. The Bayesian model adaptation procedure may update components of the Gaussian Mixture Model for which there are examples in a frame. The model adaptation may be performed on a relatively few numbers of batches (as compared to the number of batches used to generate the UBM), such that the batches used to adapt the model would otherwise be insufficient to perform a full Gaussian Mixture Model training. For example, a first batch of feature vectors taken at current network conditions may be generated. Because the first batch includes no previously adapted model, the previous model may be initialized with the UBM (i.e., $M_0$). The UBM may then be adapted with current network feature vectors from the first batch, by a Bayesian model adaptation, to generate the current model (i.e., $M_1$). Such model $M_1$ may then be used to model a distribution of feature vectors under current network conditions, and compare the distribution against the UBM. The resulting comparison of the UBM and the adapted model ($M_1$) may be a binary label ($y_1$), which may indicate whether the frame is anomalous (e.g., $y_1=1$) or typical (e.g., $y_1=0$). Similarly, at a given batch (i) a model ($M_i$) may be obtained by adapting a previous model ($M_{i-1}$) from a previous batch (i-1) with current feature vectors in the batch (i). The model ($M_i$) may then be used to model a distribution of feature vectors under typical network conditions and compare the distribution against the UBM, to determine a network anomaly level and a network label ($y_i$) for the batch i of feature vectors. The adaptation procedure may thus result in a sequence of models (e.g., $M_1$ through $M_5$; etc.). Each model in the sequence may be compared to the UBM for detecting anomalous network conditions, as described further herein.

In a step 208, a network anomaly level is determined. The network anomaly level may be determined by comparing the UBM and the model (e.g., $M_1$, $M_i$, etc.) to determine if a current distribution of feature vectors under the current model differs from a typical distribution under the UBM. In embodiments, the UBM and the current model is compared by a log likelihood ratio (LLR), as described by Equation (1).

Equation (1):

$$LLR = \log(L_{1i}) - \log(L_{0i})$$

Where $L_{0i}$ is a likelihood of batch i under the UBM
Where $L_{1i}$ is a likelihood of batch i under the model $M_i$.

The LLR may indicate whether a distribution of feature vectors in the current batch i differs from a distribution under typical network conditions. In this regard, a low LLR may indicate a current network condition is similar to typical network conditions. Similarly, a high LLR may indicate a current network condition is anomalous from typical network conditions.

Based on the LLR computed, the network anomaly level ($I_i$) may be determined for the batch (i) of feature vectors (i.e., the network anomaly level may be equal to the computed LLR). Although the network anomaly level has been described as being determined by a LLR, this is not intended as a limitation on the present disclosure. In embodiments, the network anomaly level may be determined by any suitable procedure, such as, but not limited to, a p-value of the LLR ratio under a chi-square distribution may be used to compare the UBM and the model of feature vectors under current network conditions. In embodiments, the network anomaly level may be further compared with a threshold. If the network anomaly level is less than the threshold, an anomaly label may be assigned indicating a typical network condition (e.g., $y_i$=0). If the LLR is greater than the threshold, the detector 108 may assign an anomaly label indicating an anomalous network condition (e.g., $y_i$=1).

The network anomaly level may then be stored. The steps 202-210 of the method 200 may then be performed for subsequent binary messages. In this regard, the method 200 may be iteratively performed. By performing the method 200, a time-varying set of network anomaly levels may be determined for the associated controller area network bus. In some embodiments, the time-varying network anomaly levels from the controller area network bus are fused with multiple other time-varying network anomaly levels from additional controller area network buses.

In embodiments, fusion of network anomaly level and/or labels may occur at a plurality of steps (not depicted). For example, fusion may first occur between controller area network buses (e.g., CAN bus 104a-104b) housed on the vehicle to determine a vehicle anomaly level and/or label. Vehicle anomaly level and/or labels may then be provided from the vehicles to the server 116 for determining a fleet anomaly level and/or label. By way of another example, fusion may first occur between similar networks among the plurality of vehicles (e.g., the plurality of vehicles may each include a CAN bus for engine control system, each include a CAN bus for emission systems, each include a CAN bus for vision systems, each include a CAN bus for braking systems, each include a CAN bus for comfort accessories, etc.). In this regard, network anomaly levels and/or labels for the similar networks may be may be fused to determine a fleet level network anomaly level and/or label (e.g., anomaly levels may be fused for the engine control system networks, the emission system networks, the vision system networks, the braking system network, the comfort accessory networks, etc.). This may be advantageous where the CAN bus networks for different systems exhibit different message tendencies. The fleet level network anomaly levels and/or labels may thus be appropriate for determining whether networks among the vehicles 101 (e.g., vehicle 101a-101b) are exhibiting anomalous CAN messaging such that specific types of network shared among the vehicles has undergone an intrusion (e.g., a vehicle vision system among the vehicles has undergone an intrusion). The similar network anomaly levels and/or labels may then be fused for determining the fleet anomaly level and/or label. By comparing probability distributions of the UBM and the model under current network conditions, network anomalies may be detected. Such network anomalies may be detected without requiring an example of an anomalous network condition. In this regard, the method 200, and similarly the anomaly detection system 100, the vehicle 101, and the anomaly detector 108, may be considered to detect anomalies in an unsupervised manner. Such unsupervised anomaly detection may prove advantageous in the domain of cyber-security, where new CAN bus intrusion techniques are continually developed, such that obtaining a training set associated with the new CAN bus intrusion before the intrusion occurs may not be possible.

Although the method 200 has been described as performing anomaly detection in an unsupervised manner, this is not intended to be limiting. In embodiments, a supervised machine learning classifier for detecting anomalies may be used.

Figure 3:
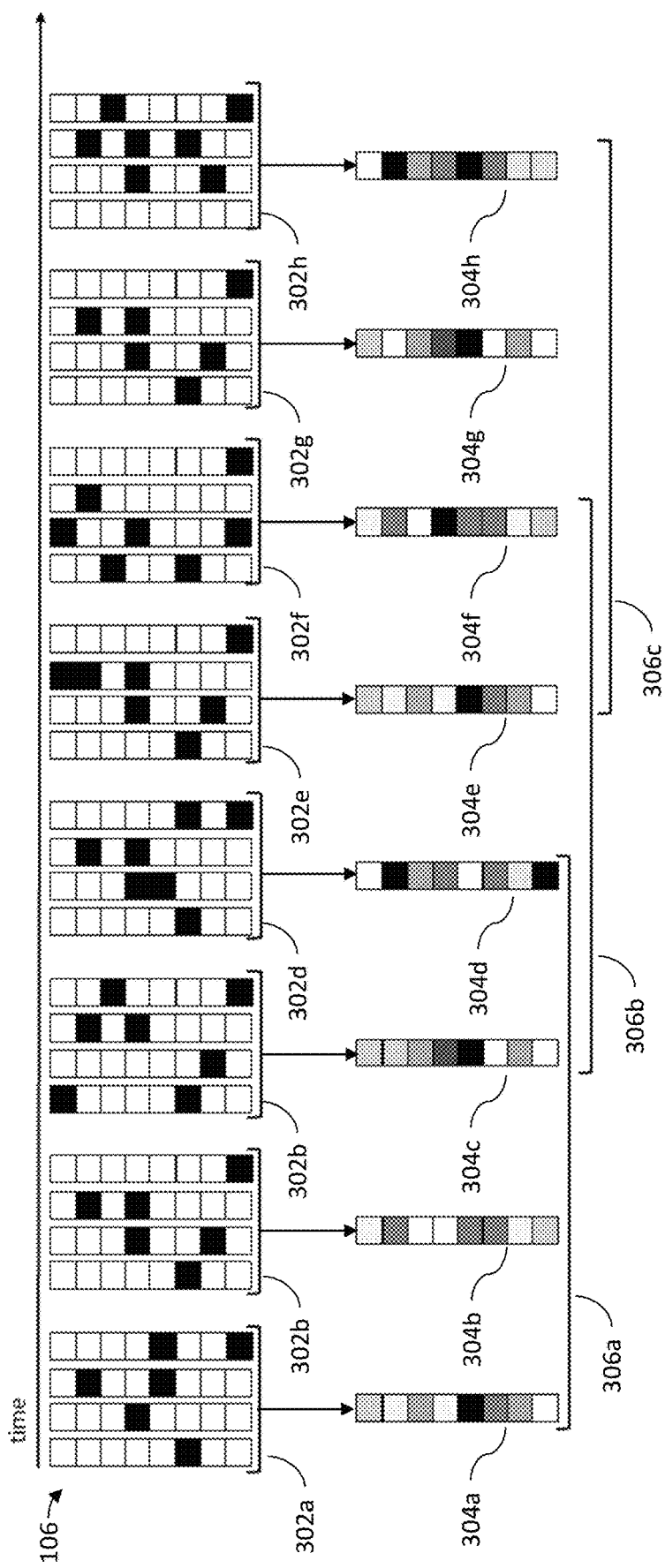
FIG. 3 illustrates a conceptual view of the process of extracting a batch of feature vectors from binary messages, in accordance with one or more embodiments of the present disclosure.

FIG. 3 further depicts the step 204 of extracting the current batch of feature vectors from the binary messages, in accordance with one or more embodiments of the present disclosure.

In embodiments, the binary messages (e.g., binary messages 106) are received from the CAN bus over a time period. The binary messages may then be binned into one or more frames 302 (e.g., frames 302a-302h). The frames 302 may include a frame width during a fixed duration in which binary messages received are included in the frame. The frames 302 may be sequential, where the binary messages in the frame 302 are not repeated in a subsequent or a prior frame, if a frame step size is greater than or equal to a frame width. Alternatively, frames may overlap with adjacent frames if a step size is less than the frame width. For example, a frame duration may be 0.1 seconds. Where a step size is less than 0.1 seconds (e.g., 0.05 seconds), the frames may overlap. Where a step size is greater than or equal to the frame duration (e.g., at least 0.1 seconds), the frames 302 may be sequential. Depending on the frame size and frame duration, the frames 302 may be cross-correlated with a prior or subsequent frame. Although the frames 302 have been described as having a fixed duration, this is not intended to be limiting. In embodiments, each frame 302 may include a fixed number of messages per frame. Similarly, the frame may include a combination of a minimum number of messages and a minimum frame duration.

In embodiments, feature vectors 304 are extracted for each frame 302. The feature vectors 304 may be extracted by an encoder. The feature vectors 304 may include a feature set of statistical functionals of fields associated with frames 302 of binary messages 106 from the CAN bus. For example, the statistical functional may include one or more of a mean, a standard deviation, a median, an inter-quartile range, or a mode. The statistical functionals may be derived from any portion of the binary message, such as, but not limited to, the arbitration field or the data field. In embodiments, the feature vectors may be determined by a learning model, such as a deep-learning model. The deep-learning model may include any suitable deep-learning model, such as, but not limited to an autoencoder or a generative adversarial network. The feature vectors may also include one or more features derived from a timestamp at which the binary messages are received One or more batches 306 may then be determined based on the feature vectors 304. For example, the feature vectors 304 may be binned into a current batch. The one or more batches 306 may optionally include a fixed or pre-determined number of feature vectors 304 per batch. For example, a batch 306a may include feature vectors 304a-304d, a batch 306b may include feature vectors 304c-304f, and a batch 306c may include feature vectors 304e-304h. This example is not intended to be limiting. In this regard, each batch 306 may optionally include any number of feature vectors 304 (e.g., 50 feature vectors or more per batch). Each batch 306 may then be used to adapt a previous probability model for determining a probability of the feature vectors 304 under the batch. For example, the batch 306a may be used to adapt a previous probability model for the feature vectors 304a-304d. By way of another example, the probability model for the batch 306a may be adapted with the batch 306b to model the probability distribution of the feature vectors 304c-304f. By way of another example, the probability model for the batch 306b may be adapted with the batch 306c to model the probability distribution of the feature vectors 304e-304h.

Similar to the discussion of overlapping frames, the batches 306 may include overlapping or sequential feature vectors 304 from a prior or a subsequent batch. As depicted in FIG. 3, a batch 306b includes feature vectors 304c-304d which overlap with batch 306c, and includes feature vectors 304e-304f which overlap with batch 306c. This configuration is not intended to be limiting, but is merely provided to illustrate an overlap of feature vectors 304 between batches 306. By the overlap between feature vectors 304 in prior or subsequent batches, the batches 306 may be cross-correlated with a prior or subsequent batch The depiction of messages 106, frames 302, feature vectors 304, and batches 306 is not intended to be limiting. For example, the message 106 may be any suitable CAN bus format. By way of another example, although FIG. 3, depicts each frame 302a-302h as including a similar number of messages per frame (e.g., 4 messages per frame) this is not intended to be limiting. As discussed previously, the frames 302 may have a fixed duration. During this duration, messages 106 received over the CAN bus 104 may be accumulated into the frame. During the frame duration any number of messages may be received (e.g., depending on an interval, if any, over which nodes of the CAN bus 104 send messages 106). By way of another example, the feature vectors 304 may include any number of feature set of statistical characteristics. Furthermore, although the features of the feature vectors 304 are depicted by grayscale boxes, this is merely intended as a graphical representation of a continuous feature vector. By way of another example, any number of feature vectors 304 may be binned in each batch 306 (e.g., up to fifty feature vectors, or more).

Referring generally to FIGS. 1A-3, the anomaly detection system 100, the vehicle 101, the anomaly detector 108, and the method 200 of anomaly detection is disclosed, in accordance with one or more embodiments of the present disclosure.

In embodiments, the system 100 includes a plurality of detectors associated with each CAN bus (not depicted). The plurality of detectors may each be based on a different feature set extracted from messages received over the CAN bus. In this regard, late fusion may be used to obtain network anomaly levels and labels.

Although the anomaly detection system 100, the vehicle 101, the anomaly detector 108, and the method 200 has been described as obtaining a network anomaly level by comparing a probability distribution of a GMM-UBM against a current model, this is not intended to be limiting. In embodiments, a network anomaly level may be determined by computing a likelihood of a batch of feature vectors under the UBM.

Although the anomaly detection system 100, the vehicle 101, the anomaly detector 108, and the method 200 has been described as generating a probability distribution function by a GMM, this is not intended as a limitation on the present disclosure. In embodiments, an alternative estimator of a probability density function may be used, such as, but not limited to, a kernel density estimation (KDE), a mean integrated square error (MISE), or a cluster-weighted model.

In embodiments, a message level anomaly may be associated with one or more messages 106 transmitted over the CAN bus 104. The message level anomaly may be determined in one or more additional steps after an initial detection of network level anomalies or fleet level anomalies.

For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory).

Furthermore, the memory may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a solid-state drive and the like. It is further noted that memory medium may be housed in a common controller housing with the one or more processors. In one embodiment, the memory medium may be located remotely with respect to the physical location of the one or more processors and anomaly detector 108.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A method of anomaly detection, the method comprising:
   receiving a plurality of binary messages from a network bus;
   generating a current batch of a plurality of feature vectors, each of the plurality of feature vectors determined based on the plurality of binary messages;
   determining a current probability model by adapting a previous probability model with the current batch of the plurality of feature vectors; and
   comparing the current probability model with a universal background model to determine a network anomaly level, wherein the universal background model provides a probability distribution of the plurality of feature vectors under typical network conditions.

2. The method of claim 1, further comprising determining time-varying network anomaly levels for the network bus by determining at least one subsequent network anomaly level for a plurality of subsequent binary messages of the network bus.

3. The method of claim 2, further comprising fusing a time-varying network anomaly level from the network bus with a plurality of time-varying network anomaly levels of a plurality of additional network buses.

4. The method of claim 3, wherein the fusing comprises a Mixture-of-Experts process.

5. The method of claim 3, wherein the plurality of additional network buses are housed on at least one of a vehicle including the network bus or at least one additional vehicle.

6. The method of claim 1, wherein the current batch of the plurality of feature vectors is determined by:
   binning the plurality of binary messages into a plurality of frames;
   extracting a feature vector for each of the plurality of frames; and
   binning the plurality of feature vectors into the current batch.

7. The method of claim 6, wherein the plurality of frames each comprise a duration and a step size such that at least one frame shares a binary message with an adjacent frame.

8. An anomaly detector for a network bus, the anomaly detector comprising:
   a communication interface configured to receive a plurality of binary messages from the network bus; and
   a memory configured to store program instructions and the plurality of binary messages received by the communication interface; and
   a processor configured to execute the program instructions stored in the memory that, when executed by the processor, cause the processor to:
     generate a current batch of a plurality of feature vectors, wherein each of the plurality of feature vectors are determined based on the plurality of binary messages;
     determine a current probability model by adapting a previous probability model with the current batch of the plurality of feature vectors; and compare the current probability model with a universal background model to determine a network anomaly level, wherein the universal background model provides a probability distribution of the plurality of feature vectors under typical network conditions.

9. The anomaly detector of claim 8, wherein each of the plurality of feature vectors comprises at least one feature derived from a statistical functional of at least one of an arbitration field or a data field of the binary messages.

10. The anomaly detector of claim 9, wherein the statistical functional comprises at least one of a mean, a standard deviation, a median, an inter-quartile range, or a mode.

11. The anomaly detector of claim 9, wherein the statistical functional is determined by a deep-learning model.

12. The anomaly detector of claim 11, wherein the deep-learning model comprises at least one of an autoencoder or a generative adversarial network.

13. The anomaly detector of claim 9, wherein each of the plurality of feature vectors further comprise at least one feature derived from a timestamp at which the plurality of binary messages are received.

14. The anomaly detector of claim 8, wherein the current probability model is adapted from the previous probability model by a Bayesian adaptation.

15. The anomaly detector of claim 14, wherein the previous probability model is adapted from the universal background model by a gaussian adaptation using a previous batch of a plurality of previous feature vectors.

16. The anomaly detector of claim 8, wherein the universal background model is determined by a Gaussian Mixture Model.

17. The anomaly detector of claim 16, wherein the Gaussian Mixture Model is trained using an Expectation Maximization algorithm.

18. The anomaly detector of claim 8, wherein the current probability model is compared with the universal background model by a log-likelihood ratio.

19. The anomaly detector of claim 8, wherein the processor is further configured to determine a network anomaly label for the plurality of binary messages by comparing the network anomaly level to a threshold.

20. An anomaly detection system comprising:
a plurality of vehicles, each of the plurality of vehicles comprising:
  at least one network bus;
  a plurality of nodes communicatively coupled by the at least one network bus, wherein at least one node of the plurality of nodes is configured to transmit a plurality of binary messages by way of the area network bus;
  at least one anomaly detector for the at least one network bus, the at least one anomaly detector comprising:
    a communication interface configured to receive the plurality of binary messages from the at least one network bus;
    a memory configured to store program instructions and the plurality of binary messages received by the communication interface; and
    a processor configured to execute the program instructions stored in the memory that, when executed by the processor, cause the processor to:
      generate a current batch of a plurality of feature vectors based on the plurality of binary messages;
      determine a current probability model by adapting a previous probability model with the current batch of the plurality of feature vectors; and
      compare the current probability model with a universal background model to determine a network anomaly level, wherein the universal background model provides a probability distribution of the plurality of feature vectors under typical network conditions; and
a server communicatively coupled to the plurality of vehicles, wherein the server is configured to receive the network anomaly level from each of the plurality of vehicles, wherein the server is configured to fuse the network anomaly level from each of the plurality of vehicles to determine a fleet anomaly level.

* * * * *